United States Patent
Nutter et al.

(10) Patent No.: US 7,980,846 B2
(45) Date of Patent: Jul. 19, 2011

(54) MACHINE FOR MAKING BONE SHAPED FIBERS

(75) Inventors: Charles Nutter, Woodbury, MN (US); James P. Wahlstrand, Maplewood, MN (US)

(73) Assignee: Wildfibre, LLC, Hamilton, MT (US)

( * ) Notice: Subject to any disclaimer, the term of this patent is extended or adjusted under 35 U.S.C. 154(b) by 273 days.

(21) Appl. No.: 12/011,227

(22) Filed: Jan. 25, 2008

(65) Prior Publication Data
US 2008/0193753 A1 Aug. 14, 2008

Related U.S. Application Data

(63) Continuation-in-part of application No. 10/953,319, filed on Sep. 28, 2004, now abandoned.

(51) Int. Cl.
*B29C 43/40* (2006.01)
*B29C 43/46* (2006.01)

(52) U.S. Cl. .......... 425/302.1; 72/204; 425/305.1; 425/363; 425/367; 425/392

(58) Field of Classification Search .......... 425/294, 425/302.1, 305.1, 335, 363, 367, 392; 72/204, 72/252.5, 331, 338
See application file for complete search history.

(56) References Cited

U.S. PATENT DOCUMENTS

| | | | | | |
|---|---|---|---|---|---|
| 3,274,815 | A | * | 9/1966 | Roemer | 72/204 |
| 3,825,393 | A | * | 7/1974 | Bittner et al. | 425/363 |
| 3,953,953 | A | | 5/1976 | Marsden | |
| 4,960,649 | A | * | 10/1990 | Takata et al. | 106/644 |
| 5,215,830 | A | * | 6/1993 | Cinti | 106/644 |
| 5,552,101 | A | * | 9/1996 | Fujii et al. | 425/294 |
| 5,981,630 | A | | 11/1999 | Banthia et al. | |
| 6,592,790 | B2 | | 7/2003 | Rieder et al. | |
| 6,773,646 | B2 | | 8/2004 | Rieder et al. | |

OTHER PUBLICATIONS

Zhu, Valdez, et al., Influence of Reinforcement Morphology on the Mechanical Properties of Short-Fiber Composites, Processings of Metals and Advanced Materials: Modeling, Design and Properties. Edited by B. Q. Li, TMS, 1998, pp. 251-259.

* cited by examiner

*Primary Examiner* — James Mackey
(74) *Attorney, Agent, or Firm* — Befumo & Schaeffer, PLLC; Andrew J. Befumo

(57) ABSTRACT

This specification discloses fiber additives for reinforcing matrix materials and an apparatus for forming the same, said fibers having flattened shanks terminated with egg-shaped nodules. The apparatus comprises a roller-former-cutter assembly that forms the fibers in a single operation from continuous filaments using compressive force and a unique cut-out and blade assembly. The fibers described are designed to have an increased pull-out resistance compared to other fiber morphologies.

10 Claims, 4 Drawing Sheets

MACHINE FOR MAKING BONE SHAPED FIBERS

CROSS REFERENCE TO RELATED APPLICATIONS

This application is a Continuation-in-part of application Ser. No. 10/953,319, filed Sep. 28, 2004, now abandoned as amended on May 2, 2007, and claims the benefit of application Ser. No. 10/953,319 under 35 U.S.C. 120 or 365(c).

STATEMENT REGARDING FEDERALLY SPONSORED RESEARCH AND DEVELOPMENT

Not applicable

REFERENCE TO A MICROFICHE APPENDIX

Not applicable

BACKGROUND OF THE INVENTION

1. Field of the Invention

This invention relates to fibers useful for reinforcing matrix materials, and more particularly to fibers having mechanically-created "bone shaped" morphologies characterized by weak surface interface bonding (allowing debonding & sliding) and locking end nodules which provide for load transfer along the length of the fiber, useful for enhanced strength, toughness, and overall performance in matrix materials such as asphalt, rubber, plastic, and particularly in such matrix materials as ready-mix concrete, shotcrete, and other hydratable cementitious compositions; and methods of forming such fibers.

2. Background of Prior Art

The fibers of the present invention are suitable for reinforcing a number of matrix materials, including asphalt, composites, plastics, etc. One of their primary intended uses is for reinforcing hydrated cementitious compositions such as ready-mix concrete, precast concrete, masonry concrete, shotcrete, bituminous concrete, gypsum and Portland cement-based composites, and other hydrated cementitious compositions. A major purpose of the fibers of the present invention is reinforcing concrete and concrete structures.

Concrete is typically a brittle material. When subjected to stresses exceeding its maximum tensile strength, cracks form and propagate in the concrete, eventually causing structural failure. The ability of a concrete structure to resist crack formation and propagation can be understood with reference to two properties: "strength" and "toughness."

Concrete "strength" relates to the initial ability of a cement or concrete structure to resist crack formation. Concrete strength is proportional to the maximum load that can be sustained without cracking. It is a measurement of the minimum load required to initiate cracking. "Toughness" relates to the ability of the concrete to resist propagation (widening) of a crack once the crack has been initiated. Toughness is proportional to the force required to propagate or widen a crack after it is initiated. Toughness is determined by concurrently measuring: a) the load required to deflect a fiber-containing concrete once a crack has formed, and b) the amount of deflection.

Fibers designed to boost absolute toughness are not new to the composites industry. They belong to a class of fibers known as 'macro' fibers, based on their relatively large size (typically greater than 25 mm in length). Most such fibers depend on adhesion along the full length of the fiber. A smaller sub-group of fibers, including the class into which the current invention falls, depend on formations at the end of the fibers that mechanically lock into the matrix, preventing fiber pull-out, and thereby increasing overall toughness. Such fibers are generally known as "bone shaped fibers," or BSF's. Los Alamos National Laboratory published literature on 'bone shaped fiber' morphology that inspired the inventor to develop the disclosed invention. Los Alamos National Laboratory abandoned fiber research due to loss of patentability and insufficient time to suggest production devices and processes. see Zhu-Byerlein [1] generally.

U.S. Pat. No. 3,953,953 (of Marsden) discloses a BSF-like fiber, describing fibers having "J"-shaped ends for resisting pull-out from concrete. One of the problems with stiff fibers having such physical deformities such as hooks or ripples is their propensity to form fiber to fiber entanglements, which poses problems in achieving uniform dispersion in a concrete mix, as well as problems with workability (slump). Other morphologies using crimped ends or ends with wave-like formations have similar problems.

The present invention is a BSF with a unique morphology comprised of a flattened rod (generally less than 50 mm long) terminated at each end by a prolate nodule. The flattened 'nodule to nodule' section of the rod is smooth and designed to be maximally free of adhesion to the host matrix. This allows for maximal crack bridging and load transfer over the entire length of the fiber. The overall shape of the prolate nodule resists mechanical fiber to fiber entanglement, resulting in it being more easily dispersed throughout a cementous hydrated concrete mix.

A uniformly flattened fiber (not a BSF) was disclosed by Rieder, et al., W. R. Grace U.S. Pat. No. 6,773,646. The fiber described in that invention was not a BSF, but was flattened over it's entire length, and micro-mechanically deformed for improved contact and adhesion with the matrix material. Although such deformation may improve pull-out resistance, the increased adhesion along the entire surface of the fiber results in a lack of load transfer over the entire length of the fiber, and fiber breakage at the crack interface, which in turn results less effective in crack bridging, load transfer, and overall toughness. Many other competitors add various wrinkles, abrasions, and other continuous modifications evenly distributed along the length of their fiber to encourage anchoring along the full length of he fibers to adhere to the matrix material, locking into the surface of the fiber. Fibers that depend on uniform 'full length of fiber' adhesion offer good initial crack mitigation up to certain levels of applied stress that is concentrated most often in a small zone along the fiber in the vicinity of the crack, but the subsequent rupture of the fiber will abruptly lower the toughness contribution that can be achieved by adhesion only methods. SI Concrete Systems (Synthetic Industries, Inc. USA), U.S. Pat. No. 5,981, 630 (Banthia, et. al), acquired a crimped (rippled) sinusoidal patterned fiber that produces a controlled but somewhat less localized stress concentration at crack intersections than do the Reider (U.S. Pat. No. 6,773,646) or other straight fibers when mitigating cracking in a host matrix. The SI sinusoidal fiber is also continuously modulated along its full length. This fiber depends on localized stress concentration at points along the fiber length. Furthermore, the 'wavy pattern' leads to poor slump (workability), at high volume fractions, and ruptures versus pullout.

SI also obtained a 'paddle fiber', via Novocon, Inc., that is formed via a roll-forming flattened ends onto steel wire fibers. The paddle fiber is not a "bone shaped fiber" as described by Zhu-Byerlein, although designed to anchor at its ends in a manner similar to a BSF fiber. Many other fibers fall into the 'paddle fiber' anchor genera such as the Baeckert Dramix™ bent wire fiber, and the Royal Environmental. Inc. (Stacy, Minn., USA) bent wire fibers. The 'paddle fiber' patent expired recently thus the fiber and production methods are in the public domain. Bent wires encourage high stress concentrations at the bends thus encourage directional cracking, and the fibers sever upon post cracking induced failure in the matrix rather than pulling out with great difficulty while further not inducing energy uptake via the required uniform micro cracking.

In view of the disadvantages of the prior art as discussed above, the present inventors believe that a novel fiber for reinforcing matrix materials, and in particular hydratable cementitious materials such as concrete and shotcrete, are needed. Also needed are novel methods for making such fibers and for modifying such matrix materials.

The present invention improves the pull-out resistance of fibers from concrete while avoiding the kinds of mechanical or physical fiber attributes that might otherwise impede the ability of the fiber to be introduced into, and uniformly dispersed within, the concrete mix. The inventor applied artificial intelligence tools in determining the maximally effective geometry for the nodule-terminated, flat centered fibers described here. This geometry optimizes dispersability in the wet matrix material while maximizing the mechanical anchoring of the end nodule once the matrix has solidified.

One of the other impediments to the commercial production of viable BSF's is the inability to rapidly and reliably form the fibers while preserving the structural integrity and properties of the precursor material. The roller-former-cutter machine, which is the basis of the method of forming the fibers described herein, and is an integral component of my invention, solves this problem. The roll-forming machine receives as feedstock a plastic monofilament or metal wire precursor. The roll-former, in one embodiment, produces the fiber morphology described in the invention, i.e., flat in the middle and terminated at each end by a nodule. The nodules are formed by troughs in the surface of the two opposing rollers. The troughs run parallel to the rotational axis of the rollers. The nodules so formed retain for the most part the whole diameter or thickness of the precursor filament or wire, while the nodule-to-nodule connecting length is roll formed flat. The flattened aspect of the middle portion of the fiber also improves flexural properties, which in turn reduces fiber rupture failure when mitigating a crack which forms at an acute angle to fiber. Also embodied in the roll-former is a fiber cut-off component, consisting of a blade residing in the center of one of the nodule-forming troughs, and a corresponding anvil that resides in corresponding trough of the opposing roller. The invention enables roll-forming at high speed and low cost. No such roll-former exists that applies troughs machined in cylinders and fiber cut-off, concurrently. The combined roller-former and blade & anvil assembly roll against the precursor monofilaments (or other precursors) pinching them flat in the middle, forming nodules at the ends, and cutting to the fibers to length, leaving a nodule terminated fiber as a result.

3. Objects and Advantages

There are several objects and advantages of the disclosed invention. The described fiber morphology provides a multifold increase in toughness over competing fibers. Compared to other macrofibers whose toughness-increasing properties depend on surface area adhesion, the inventor's BSF's are designed to 'slip' away from the matrix along the length of their shank, thereby distributing force along their entire length, rather than only in the vicinity of crack formation. Considering two fibers with equal tensile strength, the fiber that distributes force along its entire length will be able to absorb much greater force than one that has the same force applied to the area near a crack. The result is increased post crack toughness of BSF's in general, and the disclosed fiber in particular.

Compared to BSF's in prior art, the inventor's fiber has several advantages. Fibers with hook-shaped ends, "J"-shaped ends, ripples, waves, twists, or other such deformities tend to tangle with one another, leading to problems in distribution throughout the matrix, along with problems in workability. The inventor's fiber achieves the mechanical anchoring necessary to anchor to the matrix, while not being shaped in such a matter as to cause them to ball up or tangle with one another.

The disclosed invention is a true bone-shaped-fiber, the nodules of which have a smaller cross sectional area than their flattened shanks. This provides a distinct advantage over paddle-shaped fibers, whose ends have a smaller cross sectional area than their shanks. While paddle shaped fibers may function when made of steele, when made of polyolefin materials the paddle shaped ends do not provide the necessary mechanical anchoring to maximize post crack toughness. The ability to utilize polyolefins and other hydrophobic precursor materials is a key to achieving even distribution throughout a cementitious mix. In addition, polyolefins and other such plastic fiber precursors have the required ability to de-bond and 'slide' from the matrix along their shanks, allowing for maximal crack bridging and load transfer over the entire length of the fiber, which in turn leads to the increased toughness of the fiber-filled matrix.

The manufacturing method utilizing the roller-former-cutters disclosed by the inventor are a novel and unique invention that make high speed, high volume formation of bone shaped fibers possible. Other methods disclosed in prior art are either impractical for high volume fiber production, do not form bone-shaped-fibers, and/or are not practical for use with polyolefin or other plastic monofilament precursor materials.

In view of the disadvantages of the prior art as discussed above, the present inventors believe that a new fiber for reinforcing matrix materials (particularly hydrated cements such as concrete and shotcrete) is needed, along with a method for manufacturing such fibers. The invention presents a simple, practical, method of reliably forming functional bone shaped reinforcement members from monofilament or wire precursor materials.

SUMMARY OF THE INVENTION

In contrast to the above-described prior art fibers and methods for manufacturing reinforcing fibers, the present invention provides fibers which are macro-mechanically deformed to create a 'Q-tip™ like' reinforcement fiber (also known as a "bone shaped fiber," or BSF, described by Zhu, et. al at Los Alamos National Laboratory). The resulting fiber has a flat middle length that is terminated on each end with a prolate spheroidal nodule, morphology of which lends itself to roll forming methods of manufacture. Part of my invention is the roll forming machine components that form the described fiber. My fiber morphology enables the application of mechanical high-speed roll forming of monofilaments or wire to produce quasi-Q-tip-like shaped reinforcement fibers. The morphology of my fiber is a flat, straight shaft of balanced tensile to ductile properties terminated at each end of the shaft by a prolate spheroid nodule.

Using artificial intelligence algorithms, I arrived at the fiber and methods of their manufacture described herein as the optimal parameters for a fiber that will add or improve toughness in a host matrix, and that can be quickly and inexpensively manufactured from a wide range of precursor polymer or copolymer monofilaments and/or ductile metal wire. The result is reduced cracking and improve flexural strength in the fiber-hosted matrix of choice. My fiber exhibits positive slope (unlike competing fibers), force vs. displacement curves observed via ASTM1399 toughness performance tests for use in concrete or composites.

The present invention provides high performance, bone-shaped fibers and methods for manufacturing said fibers, which reinforce matrix materials against cracks without entailing the problems and limitations of prior art reinforcing fibers and their manufacturing methods.

| REFERENCED CITED PERTAINING TO BACKGROUND OF INVENTION | |
| --- | --- |
| U.S. Pat. No. | 6,592,790 |
| Rieder, et al. | Jul. 15, 2003 |
| Assignee: W. R. Grace & Co. Connecticut. | |
| U.S. Pat. No. | 6,758,897 |
| Rieder, et al. W. R. Grace & Co.-Conn. | Jul. 6, 2004 |
| U.S. Pat. No. | 6,743,646 |
| Rieder, et al. | Aug. 10, 2004 |
| U.S. Pat. No. | 5,981,630 |
| Banthia, et al. Assigned to Synthetic Industries, Inc. | Nov. 9, 1999 |
| U.S. Pat. No. | 3,953,953 |
| Marsden | May 4, 1976 |
| OTHER REFERENCES | |

[1] ZHU, VALDEZ, et al., Influence of Reinforcement Morphology on the Mechanical Properties of Short-Fiber Composites, Processings of Metals and Advanced Materials: Modeling, Design and Properties. Edited by B. Q. Li, TMS, 1998, pp. 251-259

DRAWINGS

Figures

The invention may be more readily understood considering the following written descriptions of preferred embodiments in conjunction with the accompanying drawings, wherein FIG. 1 is an enlarged perspective view of a bone shaped fiber according to the present invention.

Figure 5:
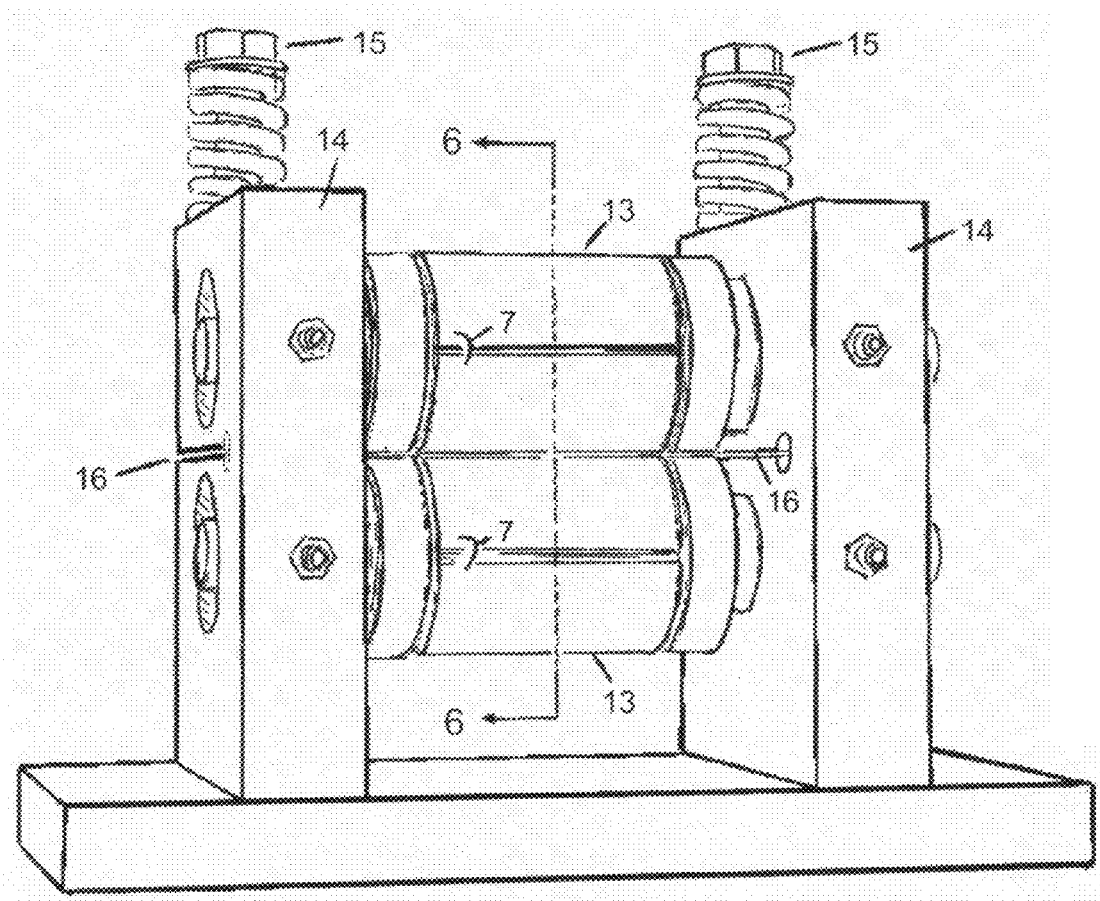
Figure 6:
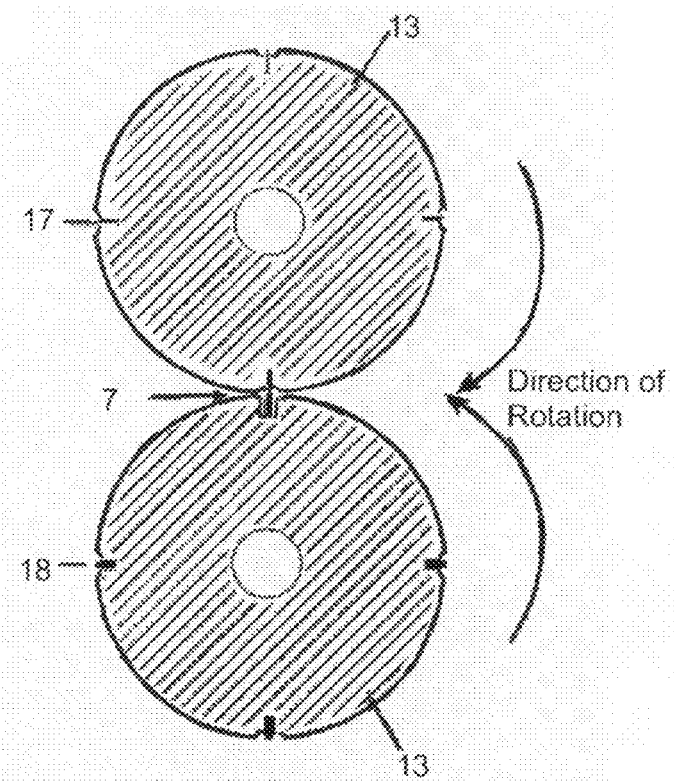
Figure 7:
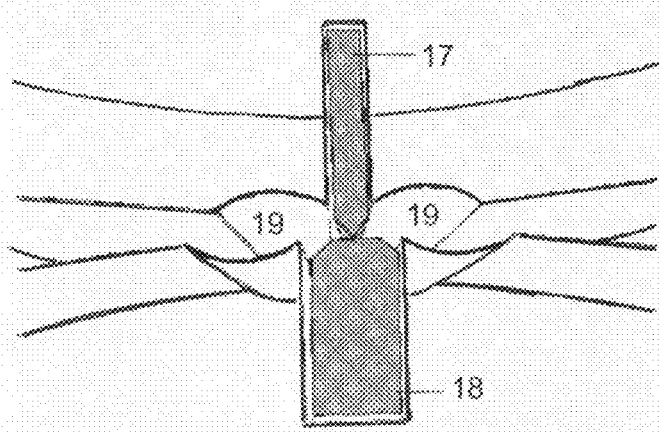

FIG. 5 is a schematic perspective view of the roller-former cylinder assembly of the apparatus for forming fibers from a precursor monofilament or wire FIG. 6 is an cross sectional schematic view of the roller-former cylinder interface in the position wherein one pair of troughs and their accompanying cutter-anvil pair are aligned, also showing the direction of rotation FIG. 7 is an enlarged, fragmentary, perspective view showing troughs and their accompanying cutter-anvil pair of FIG. 6

DRAWINGS

Reference Characters

8 flattened shank section of fiber
9 fillet section of fiber
10 portion of end nodule with diameter approximately equal to precursor material
11 end of fiber showing wide, chisel-like shape
12 fiber end nodule
13 rollers
14 side plates
15 bolt and spring tension adjusters
16 slot in side plate allowing adjustment between rollers
17 blade
18 anvil
19 trough in which end nodule is formed

DETAILED DESCRIPTION OF DRAWINGS

Preferred Embodiment of the Invention

Figure 1:
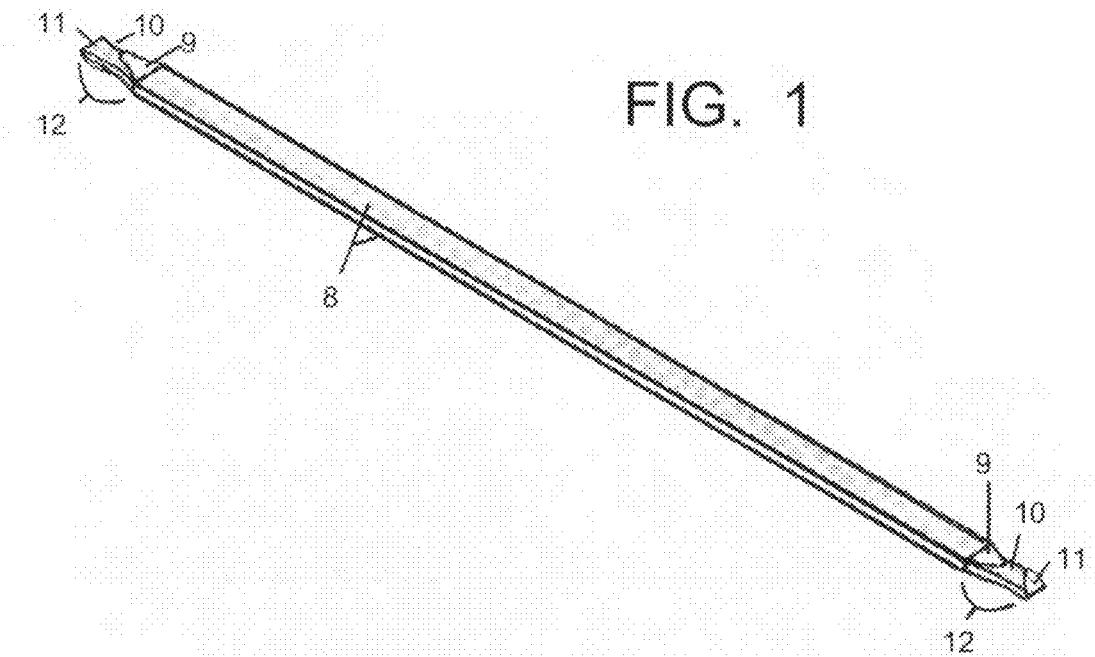

FIG. 1 shows a perspective view of one embodiment of a complete bone shaped fiber as described in the disclosure. Actual dimensions of the fiber, as well as the precise morphology of the end nodules can be varied by varying the dimensions and configuration of the roller-former-cutter components of the roll forming mechanism, as described below. The flattened center (shank) section (8) is formed by the pressured applied to the precursor wire or filaments as they pass between the roll forming mechanism depicted in FIG. 5. The end nodule (12) has a filet section (9) which is the transition area between the fattened shank and the portion of the end nodule that retains the approximate diameter of the precursor material (10). The tips of the fiber (11) are clipped or smashed into a slightly widened, chisel-like shape by the action of the blade and anvil (FIG. 7, reference characters 17 and 18, described below).

Figure 2:
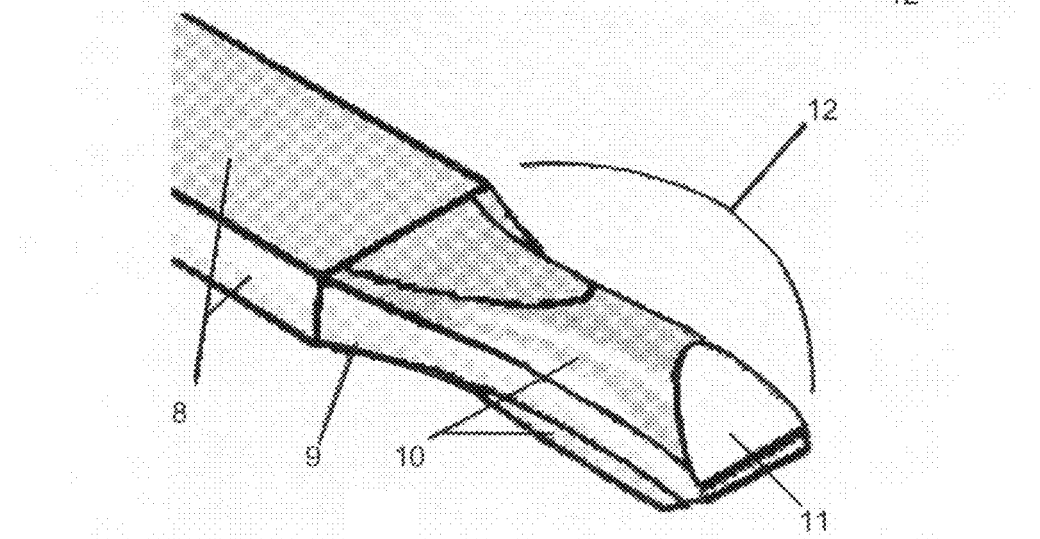
FIG. 2 is an enlarged perspective view of an end nodule of the bone shaped fiber of FIG. 1.

FIG. 2 shows an enlarged view of one of the end nodules of the fiber embodiment depicted in FIG. 1. It can bee seen from this illustration that the enlarged portion of the nodule (10), which retains the approximate diameter of the precursor material, has a significantly deeper profile that the flattened shank portion of the fiber. When the fiber is pulled free from its matrix, such as in the case of a crack intersecting the shank portion of the fiber, it is the inability of the large portion of the end nodule to be pulled through the space occupied by the flattened shank that causes the locking action of the nodule, the forces of which are concentrated in the filet area of the fiber (9) between the flattened shank (8) and the large middle section of the end nodule (10). FIG. 2 shows the approximate "egg" shape of the entire nodule.

Figure 3:
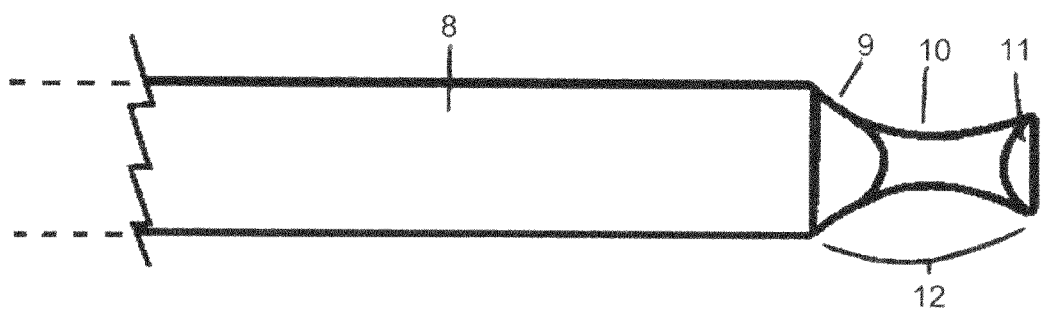
FIG. 3 is a top-down view of the end nodule of bone shaped fiber of FIG. 1.

FIG. 3 is a top-down view of a typical embodiment of the fiber described in the disclosure. It can be seen that the flattened shank (8) derives a much greater width due to the flattening action of the rollers, as compared with the end nodule (12). In the transition portion of the fiber, or 'filet' (9), the fiber decreases in width, and increases in depth (as can be seen in the following FIG. 4), until we come to the section of the end nodule that has not been flattened (10) because it has passed under the portion of the roller containing a trough (FIG. 7, reference character 19) which is purposely ground into the roller-former cylinders for the purpose of forming this enlarged portion of the end nodule. It can be seen that at its end (11) the fiber again widens. This is due to the fiber being smashed as between the blade (FIG. 6, 7, reference character 17) and anvil (FIG. 6, 7, reference character 18) as it is cut off by the action of the counter-rotating roller-former cylinders.

Figure 4:
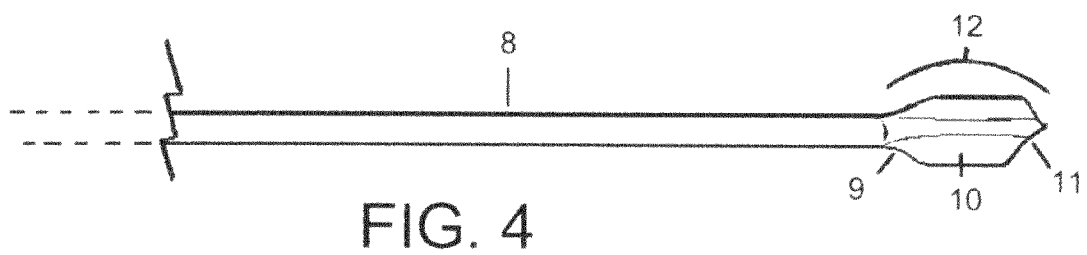
FIG. 4 is a side elevation of the end nodule of bone shaped fiber of FIG. 1.

FIG. 4 is a side elevation of a typical embodiment of the fiber described in the disclosure, and should be viewed together with FIG. 3 in order to appreciate the three dimensional shape of the fiber. In Figure we are looking at side of the flattened shank (8), which in this view presents the smallest dimension of the shank of the fiber. From this view the non-flattened dimension of the end nodule (10) is presented, along with the filet portion of the nodule, to which force is transferred when the shank pulls free from its matrix. The entire end nodule portion of the fiber is indicated by reference character 12.

FIG. 5 presents a perspective drawing of the roller-former assembly of the disclosure. The roller former assembly consists of rollers (13) mounted with their axes parallel to one another into two side plates (14). The spacing of the rollers, and consequently the amount of pressure applied to the precursor filaments or wires as they pass between the rollers, is controlled by two bolt-and-spring assemblies (15) which increase or decrease the size of slots cut in the side plates (16), which in turn control the distance between the parallel axes of the rollers. Tightening the bold and spring assemblies draw the roller cylinders closer together, and apply more pressure to the filaments as they pass between the roller cylinders. This mechanism allows a single roller-former assembly to accommodate a variety of different sizes and types of precursor filament or wire. On the face of the roller cylinders facing the viewer can be seen a pair of troughs cut into the surface of the cylinders (7), one on the upper cylinder, and one on the lower cylinder. The shafts of the cylinders are connected through a series of precision ground gears in an external gear box, such that the upper and lower cylinders can be synchronized to assure that the pairs of troughs precisely come together as the cylinders rotate. This can be seen in the following FIG. 6, which is a cross section of a pair of cylinders in a typical embodiment of the invention (cross sectional area indicated by the section line 6 of FIG. 5).

FIG. 6 shows a cross section of a pair of roller-former cylinders of a typical embodiment of the invention. The number of trough-blade-anvil inclusions on a cylinder can vary. The embodiment shown in FIG. 6 in an example of a roller-former cylinders with four pairs of trough-blade-anvil inclusions. In the embodiment shown, each complete rotation of the cylinders would produce four complete fibers from each line of precursor wire or filament that was run between the cylinders. For example, if ten precursor filaments or wires were running between the roller-former cylinders, each complete rotation would result in the formation of 40 fibers. In FIG. 6, the upper cylinder contains a blade (17) in the center of each of the four troughs cut into the cylinder, and the lower cylinder contains a corresponding anvil (18) in each of the four troughs cut into the cylinder. Only one blade and anvil are labeled in the figure for the sake of clarity, and to aid in the following description of the action of the assembly. In the position shown in the figure, the blade at the bottom of the upper cylinder is aligned with the anvil at the top of the lower cylinder (7). As the upper cylinder rotates clockwise, the lower cylinder rotates counter-clockwise, squeezing and flattening the filament passing between them. When each cylinder has rotated 90°, the next anvil and blade set in their corresponding troughs (see reference characters 19 in FIG. 7) will be aligned with each other. The portion of the precursor filament that passes between the troughs will NOT be flattened, due to the increased space between the cylinders created by the aligned troughs. As the troughs are aligned (as in FIG. 7), the precursor filament will be cut off between the blade and anvil (as are shown by the positions of reference characters 17 and 18 in FIG. 7). This cut will be made in the center of the portion of the precursor filament that has not been flattened, thus forming the nodule at the end of the fiber being cut off, and at the beginning of the next fiber. Upon the next 90° rotation of the cylinders, another fiber will be cut off from each strand of precursor filament.

Although the embodiment shown in FIG. 6 in an example of a roller-former cylinders with four pairs of trough-blade-anvil inclusions, cylinders can have more or less pairs of trough-blade-anvil inclusions. If a pair of cylinders had two such pairs of trough-blade-anvil inclusions per cylinder, they would come in contact with each other with each 180° rotation of the cylinders, and cut off two fibers per strand of precursor material per complete (360°) revolution. If a pair of cylinders had eight such pairs of trough-blade-anvil inclusions per cylinder, they would come in contact with each other with each 45° rotation of the cylinders, and cut off eight fibers per strand of precursor material per complete (360°) revolution.

FIG. 7 shows an enlarged perspective view of a pair of troughs and their corresponding blade-anvil pair, as would be seen in an enlarged view of the area indicted by reference character 7 in FIG. 6. The blade (17) is in contact with it's corresponding anvil (18). If a precursor filament were present, two nodules would be seen, one to the left of the blade-anvil pair, and one to the right, and would be formed by the troughs indicated by reference character 19. To one side of the blade-anvil pair would be the nodule at the beginning of one fiber, and to the other side would be the nodule at the end of the fiber that was being cut off from the precursor filament.

DETAILED DESCRIPTION OF THE INVENTION

The newly invented Fiber can be formed from polymer or copolymer monofilaments, or from ductile metal wire. Fiber precursor monofilaments should be highly oriented long molecular chain polymers or copolymers of optional cross-linking structure. Fiber precursor diameter is selected so as to result in the proper fiber proportions for a given fiber length. The molecular orientation remains throughout the full length of the fiber, including the nodules, with no changes caused to the molecular orientation during roll forming. Molecular alignment must extend into the nodule regions of the fiber such that tensile strength of the fiber is reasonably maintained in the nodule region, preventing nodule rupture near the end of the fiber in a host matrix crack mitigation scenario. Likewise, isotropic or anisotropic wire precursors of high ductility and tensile yield retain these properties in the finished fiber after formation by high-speed roll forming. This is a critical factor in producing workable BSF's on a large scale.

The above described process of roll forming fibers in order to maintain the molecular properties of the precursor materials is in contrast to the methods used by Byerlein and Zhu at Los Alamos National Laboratories (LANL) in their BSF studies. At LANL pure Nickle filaments were used as precursor of bone shaped fibers, which were fabricated by swinging the Ni filament through a flame from a mini hydrogen torch. The flame cut the Ni filament by melting it, and the melted Ni formed two balls on the two cut ends due to surface tension of the melted Ni. Even if it were economically feasible to mass produce fibers by this method (which it is not), this method is untenable for use with highly oriented long molecular chain polymers, as well as with other precursors whose molecular properties would be adversely affected by melting. The roll-former aspect of the disclosed invention effectively eliminates molecular level changes that would weaken the BSFs at the end nodules (thereby reducing or eliminating their effectiveness), while allowing high speed, high volume BSF fiber production.

My roll-former concurrently shapes and cuts the fibers without producing micro or macro designed or random material variations in or on the filament. The result is essentially a designed, rounded and smooth nodule at the end of each fiber, which is free of sharp corners as much as possible. The roll-forming machine receives as feedstock either polymer monofilament or metal wire as a precursor. The precursor is fed between the two rollers, where in one operation, the fiber morphology described in the invention, (i.e., flat in the middle and terminated at each end by a nodule) is formed. Specifically, the nodules are formed by functioning depressions, or 'troughs' in the surface of the two opposing rollers. The troughs run parallel to the rotational axis of the rollers. The nodules so formed retain the approximate diameter or thickness of the precursor filament or wire, while the nodule-to-nodule connecting length is roll formed flat. The distance between the parallel sets of trough pairs in the corresponding rollers dictates the length of the fiber, as well as the size of the nodules and distance between them. The result is a specifically designed, as opposed to a randomly varied, fiber deformation. Every dimension of the finished fiber is engineered and determined by the roller-former assembly and the precursor material. The troughs are generally parallel or quasi-spiral to the axes of roller rotation. The desired length of the fiber nodule is determined by the trough widths. The trough pairs (i.e., the matching troughs that align with each other as the rollers go through their rotation) which form the nodule also contain a blade and anvil (i.e., a blade in one trough, and an aligned, matching anvil in the opposing trough) which form a cut-off apparatus. (See FIG. 7). The cutters (blade and anvil) are parallel to and located in the interstitial region between the edges of the troughs. Each nodule forming cavity (trough and associated blade) precisely meshes with a like nodule forming cavity (trough and anvil) in the opposing roller. The opposing rollers pinch-cut the fiber approximately in the middle of un-flattened portion of the fiber, to achieve severance of the fiber from the precursor filament or wire, and forming a nodule at the end of one fiber, and the beginning of the next. Competing fibers that depend on full fiber length distribution of adhesion or attachment to the matrix tend to pull out easily if the fiber intersects a crack near its end, whereas the nodules in the described invention will continue to bind the matrix even if a crack intersects the fiber cose to the end nodule, thus mitigating the crack.

The resulting morphology of the above described roller-former apparatus is a smooth morphology being similar to a Q-Tip™-like shape in at least two views of rotation (due to the transition of the flat middle nodule to nodule connecting length with the un-flattened end nodules) in one embodiment. Importantly, high tensile to ductile properties are not to damaged by the production process in order to achieve fiber integrity that permits maximal energy uptake upon crack mitigation in a host matrix. The dimensions of the roller-former assembly can be varied to achieve a desired set of overall fiber length, nodule length, and nodule size to center-flattened-section ratio, allowing fibers to be tuned to achieve maximum performance with different precursor materials, and in different matrices. As the fiber in any given application is really part of a fiber-host system of interdependencies, the ability of the described fiber fabrication system to allow for an infinite variation of fiber dimensions and precursor materials, adds to the versatility of the invention.

CONCLUSION, RAMIFICATIONS, AND SCOPE OF INVENTION

The invention provides a fast, reliable, economical method to mass produce a superior and unique macrofiber that anchors at its ends, thereby providing increased performance over fibers that do not anchor at their ends. Compared with other fibers with mechanical anchoring mechanisms (e.g., hooked-end fibers, metal fibers with crimped or rolled ends) the fiber specified herein can be more quickly and economically produced with the specified roller-former mechanism, which produces the fiber in a single operation without adversely altering the properties of the precursor filaments.

While the above description contains many specificities, these should not be construed as limitations on the scope of the invention, but rather as examples of one preferred embodiment thereof. Many variations on the size and dimensions of the fiber, as well as the cutter former cylinders are possible, as well as the fibers and roll-former being able to be made from a host of precursor materials. For example, although the roller-former mechanism illustrated has four corresponding sets of troughs with their associated blade-and-anvil assemblies, rollers can have any number of such sets of trough and blade-and-anvil assemblies. Present embodiments include roller-former cylinders with two, four, and eight sets of troughs and blade-and-anvil assemblies, and there no particular limit or constraint on the number of such trough and blade-and-anvil assemblies that may occur in the roller-former cylinders. Accordingly, the scope of the invention should be determined not by the embodiment(s) illustrated, but by the appended claims and their legal equivalents.

It is claimed:

1. A machine for forming matrix-reinforcement fibers, comprising:
    at least one roller-pair comprising a first roller and a second roller, wherein a rotational axis of the first roller resides in parallel orientation to a rotational axis of the second roller; and
    wherein the roller-pair is adapted to receive and flatten sections of wire precursor feedstock in a space between a face of the first roller and a face of the second roller; and
    wherein the face of the first roller comprises at least one first-roller-trough, each first-roller-trough residing in parallel orientation to the rotational axes of the first and second rollers, wherein each of the first-roller-troughs comprises a blade; and
    wherein the face of the second roller comprises a number of second-roller-troughs equal to the number of first-roller-troughs, each second-roller-trough residing in parallel orientation to the rotational axes of the first and second rollers, wherein each of the second-roller-troughs comprises an anvil; and
    wherein each first-roller-trough acts in unison with one opposing second-roller-trough to form a trough-pair; and
    wherein the anvil and blade of each trough-pair form a cutting means to cut the wire precursor feedstock into finished lengths of fiber of pre-determined lengths; and
    wherein each trough-pair further comprises a nodule-forming means to form one nodule at a first end, and one nodule at a second end of the finished length of fiber.

2. The machine according to claim 1, wherein the rotational axes of the first and second rollers are mounted into first and second side plates.

3. The machine according to claim 1, further comprising an adjusting means to control the space between the face of the first roller and the face of the second roller.

4. The machine according to claim 1, further comprising a synchronization means to synchronize rotational position of the first roller with rotational position of the second roller.

5. The machine according to claim 1, wherein the trough pairs are orientated such that each finished length of fiber extends from the nodule at the first end of the finished length of fiber through a flattened shank and terminates at the nodule at the second end of the finished length of fiber.

6. The machine according to claim 1, wherein the nodule forming means is shaped such that each nodule comprises a prolate spheroidal nodule.

7. The machine according to claim 1, wherein each trough pair is shaped such that each finished length of fiber comprises a bone shaped fiber.

8. The machine according to claim 1, wherein each trough pair is shaped such that each finished length of fiber comprises: a first fillet section comprising a transition from a flattened shank to the nodule at the first end of the fiber; and a second fillet section comprising a transition from the flattened shank to the nodule at the second end of the finished length of fiber.

9. The machine according to claim 8, wherein each trough pair is shaped such that the first and second fillet sections each comprise a section of the fiber which decreases in width and increases in depth as each filet section approaches its respective nodule.

10. The machine according to claim 1, wherein the nodule forming means is shaped such that each nodule has substantially the same diameter as the wire precursor feedstock.

\* \* \* \* \*